UNITED STATES PATENT OFFICE 2,665,267

COPOLYMERS OF 1-ACYLOXY-3-BUTEN-2-ONE

Joseph M. Wilkinson, Jr., Easton, and John P. Barker, Media, Pa., assignors to General Aniline & Film Corporation, New York, N. Y., a corporation of Delaware No Drawing. Application December 20, 1950, Serial No. 201,862

6 Claims. (Cl. 260—63)

This invention relates to polymerization of 1-acyloxy-3-buten-2-one with other polymerizable unsaturates. As examples of the latter, there may be mentioned isobutyl vinyl ether, styrene, vinyl acetate, maleic anhydride, diethyl fumarate, vinyl chloride, acrylonitrile, methyl methacrylate, etc. However, the compounds mentioned above are not meant to restrict in any way the comonomers which may be employed, but rather are noted to indicate the wide variety of compounds that are operable.

The 1-acyloxy-3-buten-2-ones are known as a class and are disclosed in U. S. Patent 2,524,025; they may be prepared as disclosed in this patent and by other methods. They are illustrated hereinafter by acetoxymethyl vinyl ketone, inasmuch as this material is readily available and is regarded as yielding products having the widest field of utility.

The preferred 1-acyloxy-3-buten-2-ones, which we employ in accordance with the present invention, are those in which the acyl group corresponds to that of a saturated monocarboxylic acid selected from group consisting of acetic, propionic, butyric, isobutyric, valeric, capric, lauric, myristic, palmitic and stearic acids.

These copolymerizations may be carried out with or without a solvent in the presence of a peroxide type or Friedel-Crafts catalyst or ultraviolet radiation and preferably in an inlet atmosphere, such as nitrogen, within the temperature range of 50° C. to 100° C. The polymerization may be carried out at atmospheric or superatmospheric pressure depending upon the conditions and the nature of the comonomer employed.

Depending upon the comonomer employed and the reaction conditions, the polymeric products vary in consistency from tough, elastomeric materials to brittle solids. Such products find particular application in pressure sensitive adhesives, molding powder, laminates, textile and leather finishing agents, sheeting, paper fillers, etc.

It will be understood that the copolymers may contain other additives, such as other polymers or copolymers, plasticizers, fillers, pigments, solvents, etc., as will be understood by those skilled in the art. The properties of the ketone and the other polymerizable unsaturate or mixture of unsaturate may be varied widely. For example, 10 parts of the ketone may be combined with from 1 to 100 parts of the other unsaturate, and the ratio is preferably 2 parts of the ketone to one part of the other unsaturate.

The following examples are illustrative of preferred embodiments of the invention, but substitutions and variations may be made within the scope of the claims:

EXAMPLE 1

Into a reactor were charged: 19.2 parts by weight of acetoxymethyl vinyl ketone; 15.0 parts of isobutyl vinyl ether (freshly distilled over KOH pellets); and 0.68 part technical lauroyl peroxide (Alperox C). After one-half hour in a 60° C. oven, a vigorous reaction took place giving a tough, cream-colored copolymer which was dissolved in acetone and reprecipitated in diethyl ether. The copolymer was then dried to constant weight by vacuum. A yield of 8 parts (25% of theoretical) of a tough, porous, white copolymer was found.

*Analysis*

| Calculated, percent | Found, percent |
|---|---|
| C = 63.13 | 58.54 |
| H = 8.83 | 7.90 |

$n_{sp} = 1.42$

EXAMPLE 2

A reactor was charged with the following: 19.2 parts by weight of acetoxymethyl vinyl ketone; 15.6 parts of styrene (freshly distilled); and 0.70 part of technical lauroyl peroxide (Alperox C). The treatment received was the same as in Example 1 giving the same vigorous reaction. After being dissolved in acetone the copolymer was reprecipitated in hexane giving a brittle, white, flakey product. The yield was 20 parts or 58% of theoretical.

*Analysis*

| Calculated, percent | Found, percent |
|---|---|
| C = 72.39 | 73.82 |
| H = 6.94 | 8.01 |

$n_{sp} = 0.34$

EXAMPLE 3

A reactor was charged with: 19.2 parts by weight of acetoxymethyl vinyl ketone; 12.9 parts of vinyl acetate (freshly distilled); and 0.64 part of technical lauroyl peroxide (Alperox C). After 15 minutes in a 60° C. oil bath, the monomers started reacting violently leaving a light yellow mass which was reprecipitated in hexane from acetone. A yield of 21 parts (66% of theoretical) of tough, white, porous copolymer was gotten.

*Analysis*

| Calculated, percent | Found, percent |
|---|---|
| C=56.07 | 58.57 |
| H=14.11 | 8.13 |

$n_{sp}=0.42$

EXAMPLE 4

A reactor was charged with: 19.2 parts by weight of acetoxymethyl vinyl ketone; 14.7 parts of maleic anhydride (Natl. Aniline rods); and 0.68 part of technical lauroyl peroxide (Alperox C). The monomers started reacting with moderate vigor after 20 minutes in a 60° C. oil bath. The polymer-monomer solution was moderately viscous and contained many fine, suspended crystals. Upon heating for 1½ hours more there was no more apparent copolymerization. After reprecipitation from acetone into CCl₄, a 13 part (38% of theory) yield of brittle, white copolymer was found.

*Analysis*

| Calculated, percent | Found, percent |
|---|---|
| C=53.10 | 52.64 |
| H= 4.46 | 5.70 |

$n_{sp}=0.28$

EXAMPLE 5

The following were charged into a reactor: 19.2 parts by weight of acetoxymethyl vinyl ketone; 25.8 parts of diethyl fumarate (Eastman Kodak); and 0.90 part of technical lauroyl peroxide (Alperox C). After one-half hour in a 60° C. oven, a vigorous reaction took place giving a copolymer which, when reprecipitated from acetone into hexane, we got a tough, white, porous copolymer. The yield was 9 parts or 20% of theory.

*Analysis*

| Calculated, percent | Found, percent |
|---|---|
| C=55.99 | 54.33 |
| H= 6.71 | 7.31 |

$n_{sp}=0.34$

EXAMPLE 6

Into a reactor was charged: 19.2 parts by weight of acetoxymethyl vinyl ketone; 8.0 parts of acrylonitrile (freshly distilled); and 0.54 part of technical lauroyl peroxide (Alperox C.). These monomers after one-half hour in a 60° C. oven reacted vigorously giving a copolymer which, when reprecipitated from N,N'-dimethyl formamide into hexane, was tough and white in color. The yield was 15 parts or 55% of theory.

*Analysis*

| Calculated, percent | Found, percent |
|---|---|
| C=59.66 | 56.01 |
| H= 6.12 | 6.64 |
| N= 7.73 | 5.78 |

$n_{sp}=0.43$

EXAMPLE 7

A reactor was charged with: 19.2 parts by weight of acetoxymethyl vinyl ketone; 15.0 parts of methyl methacrylate (freshly distilled); and 0.68 part of technical lauroyl peroxide (Alperox C). The bottle was placed in a 60° C. oven and in one-half hour a vigorous reaction had taken place. A cream, crude polymer was formed and this was reprecipitated from acetone into CCl₄ giving 17 parts (50% of theory) of tough, flakey, colorless copolymer.

*Analysis*

| Calculated, percent | Found, percent |
|---|---|
| C=57.88 | 57.20 |
| H= 7.07 | 7.24 |

$n_{sp}=0.485$

We claim:
1. A copolymer comprising 10 parts of 1-acyloxy-3-buten-2-one, in which the acyl group corresponds to that of a saturated monocarboxylic acid selected from the group consisting of acetic, propionic, butyric, isobutyric, valeric, capric, lauric, myristic, palmitic and stearic acids, and 1 to 100 parts of a polymerizable unsaturated compound selected from the group consisting of vinyl acetate, vinyl chloride, isobutyl vinyl ether, maleic anhydride, diethyl fumarate, acrylonitrile, and methyl methacrylate.

2. A copolymer comprising 2 parts of acetoxymethyl vinyl ketone and 1 part of isobutyl vinyl ether.

3. A copolymer comprising 2 parts of acetoxymethyl vinyl ketone and 1 part of styrene.

4. A copolymer comprising 2 parts of acetoxymethyl vinyl ketone and 1 part of vinyl acetate.

5. A copolymer comprising 2 parts of acetoxymethyl vinyl ketone and 1 part of diethyl fumarate.

6. A copolymer comprising 2 parts of acetoxymethyl vinyl ketone and 1 part of maleic anhydride.

JOSEPH M. WILKINSON, JR.
JOHN P. BARKER.

References Cited in the file of this patent
UNITED STATES PATENTS

| Number | Name | Date |
|---|---|---|
| 2,055,456 | Eichwald | Sept. 22, 1936 |
| 2,484,501 | Hagemeyer | Oct. 11, 1949 |
| 2,524,025 | Wilkinson | Sept. 26, 1950 |